June 2, 1931.  A. J. FRAME  1,808,029
LIQUID MEASURE
Filed Jan. 18, 1930   2 Sheets-Sheet 1
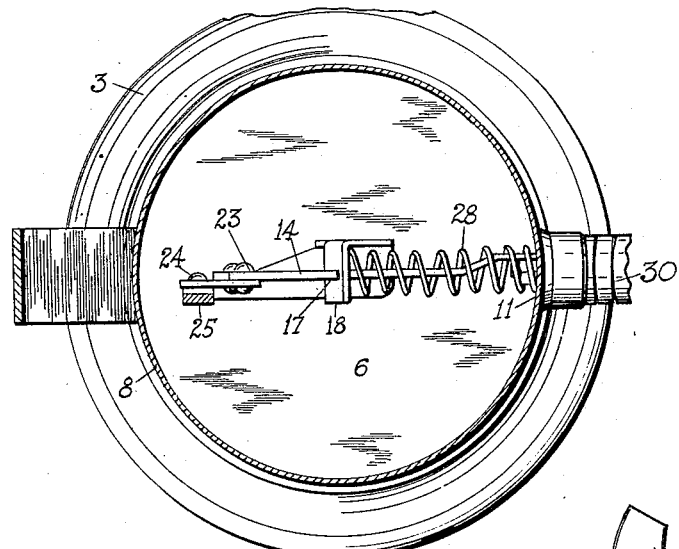
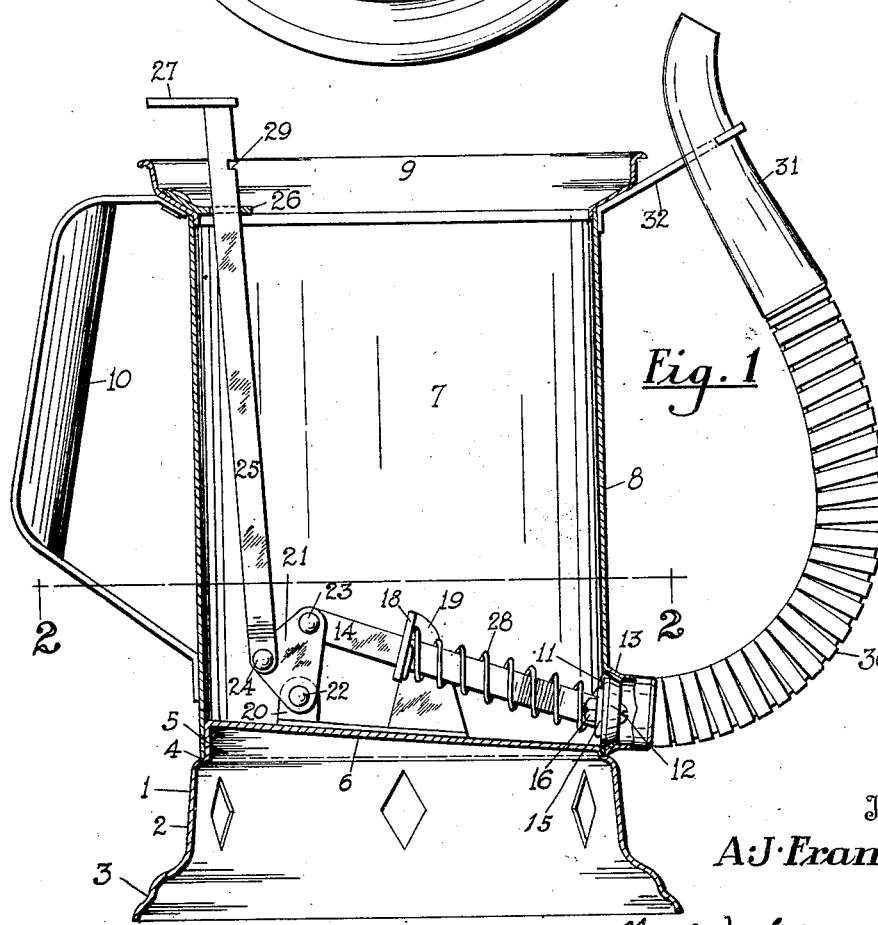
Fig. 2
Fig. 1
Inventor
A. J. Frame
By W. P. McElwell
Attorney June 2, 1931.  A. J. FRAME  1,808,029
LIQUID MEASURE
Filed Jan. 18, 1930   2 Sheets-Sheet 2

Inventor
A. J. Frame

Patented June 2, 1931

1,808,029

UNITED STATES PATENT OFFICE

AUGUSTUS J. FRAME, OF COLUMBUS, OHIO, ASSIGNOR TO THE COLUMBUS AUTO BRASS COMPANY, OF COLUMBUS, OHIO, A CORPORATION OF OHIO

LIQUID MEASURE

Application filed January 18, 1930. Serial No. 421,827.

The present invention relates to liquid measures of the type wherein liquid is discharged from the bottom through a flexible spout which delivers the liquid to a desired position of discharge, measures of this type being commonly used by automobile filling station establishments and garages for measuring and delivering oils to the crank cases of automobile engines although, of course, the measures have a much wider scope of utility.

It is an object of the present invention to improve the construction and efficiency of liquid measures of this type particularly in the matter of providing a peculiar bottom structure wherein complete discharge of the contents of the measure is assured even though the measure may not be supported, at the time of liquid discharge, with its longitudinal axis in a true vertical plane.

It is another object of the invention to provide a liquid measure wherein the liquid receiving chamber thereof is provided with an outlet formed in the substantial cylindrical side wall of the measure and wherein the chamber is provided with a flat bottom arranged at an angle with respect to the horizontal in order that the liquid received within said chamber will be caused to positively flow with complete discharge toward and through said outlet.

It is another object of the invention to provide an easily operated and efficient valve mechanism, subject to manual control for governing the opening and closing of said outlet and wherein the mounting for the valve mechanism is such that when the latter assumes a position opening said outlet, said valve mechanism will be disposed in spaced relation from the bottom to avoid interference with the flow of the liquid through said outlet.

Further objects of the invention will appear as the device is described in detail.

Figure 3:
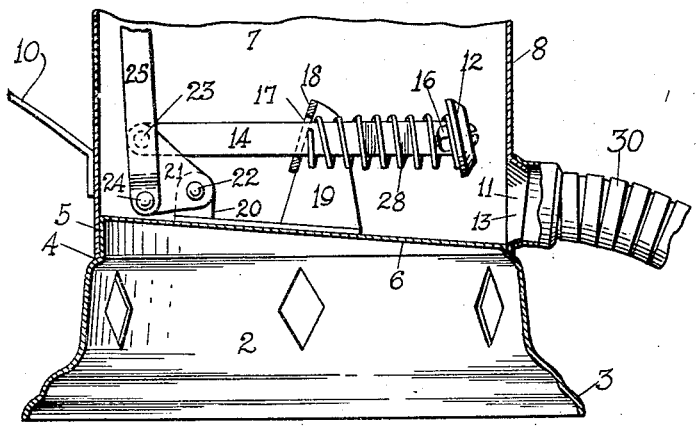
Figure 4:
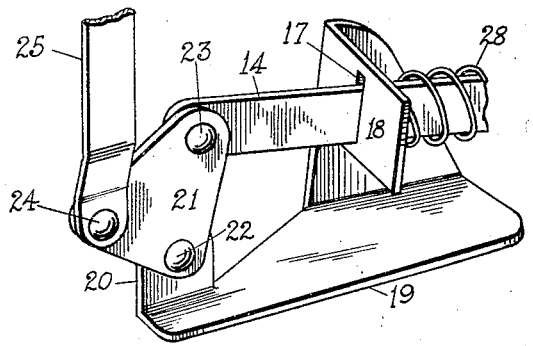
Figure 5:
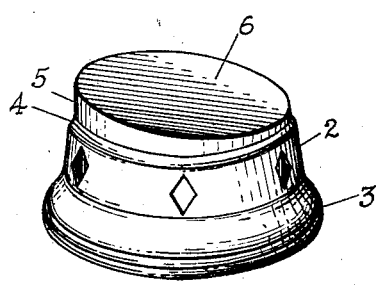
Figure 6:
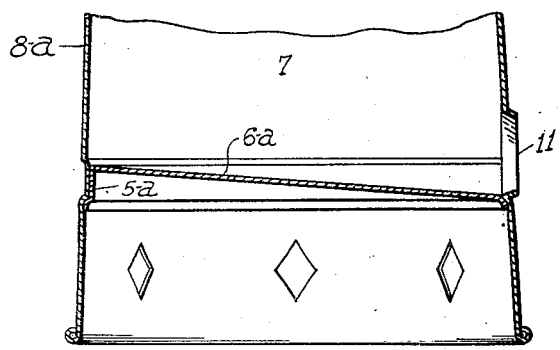

In the accompanying drawings:

Figure 1 is a vertical sectional view taken through a liquid measure constructed in accordance with the present invention, Figure 2 is a horizontal sectional view, the plane of which being indicated by the line 2—2 of Figure 1, Figure 3 is a detail vertical sectional view disclosing the valve mechanism in a port or outlet opening position, Figure 4 is a detail perspective view of the supporting bracket constituting a part of the valve mechanism, Figure 5 is a detail perspective view of the bottom of the measure, and Figure 6 is a detail sectional view of a modified form of measure.

Referring more particularly to the drawings, the numeral 1 designates the base of the measure. In the preferred form of the invention this base is formed from sheet metal which is pressed or otherwise fashioned to produce a cylindrical collar 2 which is widened to flare at its lower end, as indicated at 3 to produce a substantial structure which will rest steadily upon a supporting surface. Adjacent to its top the collar 2 terminates in an inwardly directed annular shoulder 4 from which rises a guide skirt 5 having walls of varying height. The upper portion of the skirt 5 then terminates in a flat planar bottom 6 of substantial circular form when viewed in plane but which is disposed to occupy a plane angularly with respect to the horizontal so that liquids engaging the upper surface of the bottom will gravitate toward this lower edge.

To produce a liquid receiving and measuring chamber 7 the base 1 carries a sheet metal cylinder 8 which, in this instance, is approximately uniform in diameter throughout the height thereof. The lower edge of the cylinder 8 rests upon the shoulder 4 while the adjoining inner surfaces of the cylinder flatly engage with the outer wall of the skirt portion 5, to which the cylinder may be secured by a soldering or welding operation. Secured to the upper edge of the cylinder 8 is a downwardly flaring annular rim 9 which increases, somewhat, the diameter of the open entrance portion of the measuring chamber 7. Secured to the cylinder 8 and the rim 9 is a sheet metal handle 10 by which the measure may be supported by the hand of the operator.

To effect the discharge of the liquid contents of the measure it has been customary heretofore to provide the bottom 6 with an outlet somewhere within the confines of the bottom. I have found that better results in the matter of liquid discharge from the receptacle can be secured by locating the outlet 11 in the side wall of the receptacle contiguous to the lowermost portion of the inclined plane which forms the bottom 6. These measures or receptacles are principally used for the purpose of handling and measuring heavy viscous fluids such as engine lubricating oils, and its is highly important to secure free and unobstructed flow of such liquids and complete discharge thereof from the measuring chamber at the required time. Obstructions in the path of the liquid tend to retard flow and also, in many measures, unless the same are held in a proper upright position a complete discharge of the liquid may not be secured. However, by locating the outlet 11 in the side wall of the measure at the position shown in Figure 1 the desired complete outflow is readily obtained and, furthermore, this result is assured by the inclined bottom 6, which possesses a pitch or angle sufficiently steep to cause the liquid engaging with its upper surfaces to flow towards said outlet even though the longitudinal axis of the measure may not occupy a true vertical plane.

To regulate the flow of the liquid from the measuring chamber and through the outlet, I provide a conical valve head 12 which engages with a correspondingly formed seat 13 which constitutes one of the inner walls of the outlet. The head 12 is carried by a movable bar 14 which has its forward end provided with a laterally offset ear 15 to which the head 12 is bolted or otherwise secured as at 16. The bar 14 has its intermediate portion received within an elongated slot 17 formed in connection with a tongue 18 comprising a part of a bracket 19. This bracket is secured to the inclined surface 6 of the base and is additionally formed at one end with an upright ear 20 upon which is mounted a bell crank lever 21. One corner of this lever is pivoted as at 22 to the ear 20, the second corner is pivoted as at 23 to the end of the bar 14 opposed to the head 12, while the third corner of the lever is pivotally connected as at 24 with the lower end of an actuating stem 25. This stem passes upwardly and substantially vertically through the measuring chamber and has its upper end received within a guide 26 which projects from the inner surface of the rim 9. The extreme upper end of the stem 25 is provided with a thumb piece 27 which permits the stem to be guided by the thumb of the hand which supports the measure by grasping the handle 10. It will be seen that by forcing the stem downwardly from the position shown in Figure 1, the lever 21 may be rocked by its pivot 22 which causes arcuate swinging movement on the part of the connection 23. As a result of this movement the bar 14 is drawn rearwardly against the resistance of a coil spring 28, which surrounds the forward portion of the bar and is positioned between the head 12 and the tongue 18. Due to the arcuate swinging movement of the lever 21 and the location of the slot 17 and the tongue 18 the bar 14 and the head 12 thus retracted follows a curvilineal path, with the result that the head 12 is lifted from a position contiguous to the bottom 6 and assumes the raised or open position, disclosed in Figure 3, wherein the head is appreciably spaced from the bottom 6 and is free of the outlet 11 so that full and unhindered flow of the lubricant or other liquid may proceed through said outlet. The upper end of the stem 25 is notched as at 29 for engagement with the guide 26, so that the valve mechanism may be locked or retained, without continued application of finger pressure, in its open position.

The outlet 11 is connected with the inner end of a flexible metallic conduit 30 which carries a metal spout 31 at its outer end. When the measure is inactive the spout is engaged with a fixed hook 32 projecting forwardly from the measure so as to retain the spout and its associated conduit in an elevated and out-of-the-way position.

This construction in addition to the matter of providing for an unobstructed outflow of the liquid is of additional value from the manufacturing standpoint. By separately forming the base from the wall structure produced by the cylinder 8, the valve mechanism may be mounted on the base prior to the connection of the latter with the side wall, which greatly simplifies the operation of assembling these movable parts and results, as explained, in economy and facility in manufacturing. The single bracket 19 serves to positively regulate the relationships between the relatively movable parts consisting of the bar 14, the lever 21 and the stem 25 so that these parts may be operated freely, in proper order and without excessive friction.

If desired, however, the bottom 6a disclosed in Figure 6 may have its outer portion provided with a flanged skirt 5a, which engages with a rolled bead formed in connection with a cylinder 8a, and the principles of the invention, of course, are applicable to other forms.

While I have shown and described the preferred embodiment of my invention, it will be understood that changes may be made in the details of construction without departing from the spirit of the invention or the scope of the appended claims.

What is claimed is:

1. In a liquid measure, a base of inverted cup-like formation, a substantially cylindrical body having its lower edge secured to the upper portion of said base, and for which the top of said base constitutes a bottom, said body in conjunction with the upper wall of said base providing a liquid receiving and measuring chamber, an outlet provided in the wall of said body portion contiguous to the bottom of said chamber, a flexible spout connected with and forming a continuation of said outlet, and a manually operated valve mechanism mounted wholly upon said bottom for regulating liquid flow through said outlet.

2. In a liquid dispensing and measuring receptacle, a base of inverted cup-like formation, the upper surface of said base being arranged in a single plane disposed in angular relationship with respect to the horizontal, a body comprising a cylinder open at both ends and having the lower end thereof secured to said base, an outlet provided in the wall of said body adjacent to the lowermost point of the inclined upper surface of said base, and a valve for governing liquid flow through said outlet.

3. In a liquid measure, a body provided with a bottom at its lower portion, the upper surface of said bottom being inclined with respect to the horizontal and arranged in a single plane, an outlet provided in said body contiguous to the lower portion of the inclined surface of said bottom, a bracket fixed to said bottom provided with an opening, a valve for regulating the flow through said outlet having its stem portion extending through said opening, a spring for maintaining said valve in a liquid arresting position, a lever arranged for rocking movement and pivotally connected with the inner end of said stem, and a vertically disposed stem also pivotally connected with said lever and operable upon manual operation to move said valve to an outlet opening position and to slide and rock said valve stem upon said bracket so that the valve will be positioned spaced from the bottom of said measure.

4. In a liquid measure, a body provided with an inclined bottom for closing its lower end, an outlet provided in the side of said body above but adjacent the lowest point of said bottom, a bracket fixed to said bottom and provided with an opening, a valve for regulating the flow through said outlet having its operating stem extending through said opening, the inner end of said stem being located at a point above that of its other end, and manually operable means operatively connected to the inner end of said stem for effecting a sliding and rocking movement of said stem upon said bracket and to withdraw said valve from engagement with the outlet and to simultaneously raise the same to a position spaced from said bottom.

5. In a liquid measure, a body provided with an inclined bottom at its lower portion, an outlet provided in the side wall of said body and located above and contiguous to said bottom, said outlet being formed to provide a tapered valve seat, a tapered spring pressed valve for said seat, a bar connected to said valve and slidably received within the opening provided in said bracket, said bar being angularly positioned with respect to said bottom and having its inner end located at a point higher than that of its other valve connecting end, a lever mounted for rocking movement above said bottom and pivotally connected to the inner end of said bar, and a vertically disposed stem pivotally connected to said lever and operable upon manual operation to rock said lever upon its pivotal mounting to effect an initial outer movement of said bar and valve so that the latter will free the tapered seat of said outlet, said bar will upon further sliding movement rock so as to raise said valve to a position spaced from said bottom.

6. In a liquid measure, a body provided with a bottom and having a discharge outlet in its side wall at a position to discharge all of the contents of the body from said bottom, a valve adapted to close said outlet, and means for moving said valve inwardly with respect to said outlet and upwardly with respect to said bottom.

7. A liquid measure comprising a cylindrical body, a bottom therefor, said bottom having a discharge outlet in its side in a position to discharge all of the contents of the body from above said bottom, a valve adapted to close said outlet, a handle carried by the body for supporting the same, and means operable from a position adjacent said handle for moving said valve inwardly with respect to said discharge outlet and upwardly with respect to said bottom.

8. In a liquid measure, a cylindrical body, an inclined bottom for the same, said body having a discharge outlet in its side at a point adjacent the lowest portion of said bottom, a valve adapted to close said outlet, and means operable from a point outside of said body for moving said valve inwardly with respect to the outlet and upwardly with respect to the bottom.

9. A liquid measure of the character described comprising a tubular body portion, a combined bottom and base made as a separate unit from the body portion upon which the body portion is mounted, a discharge outlet in the side wall of the body portion at a position to discharge all of the contents of the body from above said bottom, a valve adapted to close said outlet, and means mounted wholly upon said bottom and operable from a point outside of said body for moving the valve transversely across said bottom and away from said discharge outlet.

10. A liquid measure comprising a cylindrical body portion and a combined bottom and base upon which said body portion is secured made as a separate unit from the body portion, a discharge outlet in the side wall of the body portion at a position to discharge all of the contents of the body from above said bottom, a valve adapted to close said outlet, a stem for said valve, a bracket mounted upon the bottom through which said stem passes, a spring bearing between said bracket and the valve, and means operable from a point outside of the body for moving said stem against the action of said spring transversely across said bottom and away from said discharge outlet.

In testimony whereof I affix my signature.

AUGUSTUS J. FRAME.